Jan. 14, 1969  R. NEUSCHOTZ  3,421,564
SELF-ALIGNING THREADED FASTENER
Filed March 7, 1966
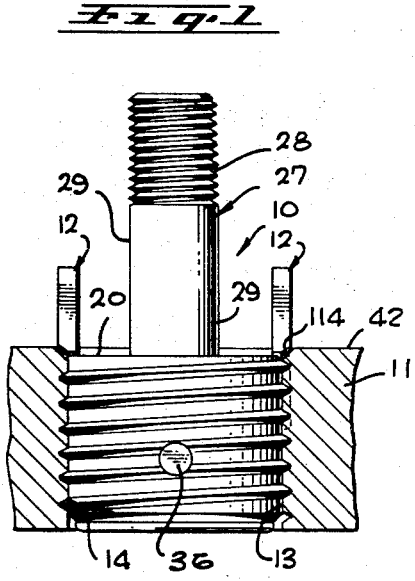
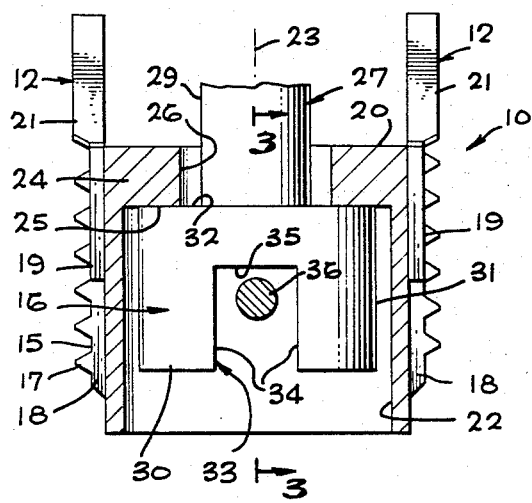
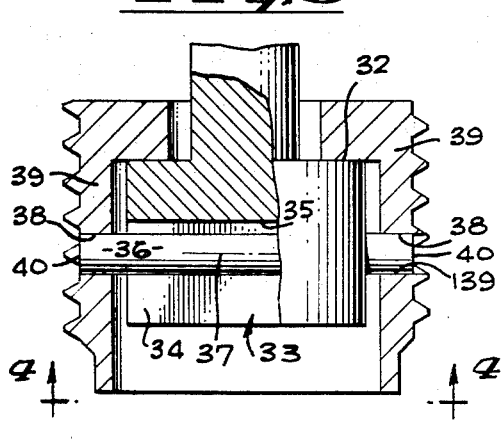
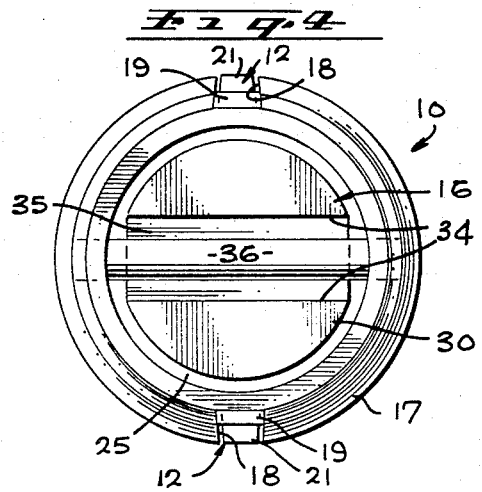
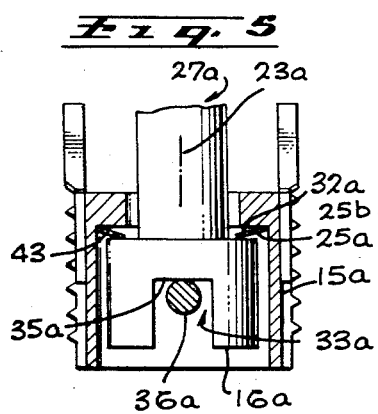
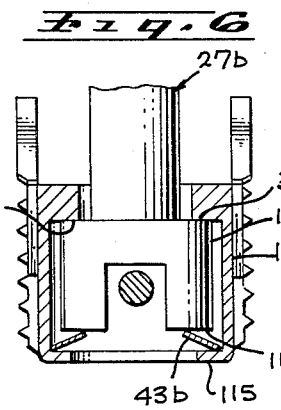
ROBERT NEUSCHOTZ
INVENTOR.
BY William P. Green
ATTORNEY

United States Patent Office 3,421,564
Patented Jan. 14, 1969

3,421,564
SELF-ALIGNING THREADED FASTENER STUD
Robert Neuschotz, 1162 Angelo Drive,
Beverly Hills, Calif. 90210
Filed Mar. 7, 1966, Ser. No. 532,434
U.S. Cl. 151—23    11 Claims
Int. Cl. F16b 39/06

ABSTRACT OF THE DISCLOSURE

A self-aligning fastener including an outer hollow body to be screwed into a carrier part, a threaded element having a portion which is contained within the body and retained thereby against axially outward movement but is free for relative self-aligning movement, and a pin extending transversely across the interior of the hollow body and connected at its opposite ends to the side wall of the body and engageable with the threaded element in a relation retaining it against rotary movement.

---

This invention relates to improved fasteners, and more particularly to externally threaded studs to be connected into a carrier part or parent material, in order to enable attachment of another member through the stud to that carrier part.

The general object of the invention is to provide a stud assembly having a built-in capacity for self-aligning movement, so that the threaded portion of the stud may shift relative to a carrier part into which the assembly has been connected, in a manner enabling automatic alignment of the stud with a mating part. A more particular object is to provide a self-aligning stud assembly of this type which is structurally very simple and inexpensive to manufacture, which is very easily assembled during manufacture, and yet which is capable of taking heavy axial and rotary load forces to which the stud may be subjected in use.

Certain unique features of the invention relate to a preferred manner in which the shiftable stud is retained against rotation relative to an outer body of the fastener assembly during connection of another member to the stud. Specifically, the stud is retained against turning by means of a pin which extends generally transversely of the axis of the stud across the interior of the outer body, and is desirably connected at its opposite ends to that body. The shiftable stud element is then provided with shoulders which are engageable with the pin in a manner holding the stud against rotation in the body. Desirably, the stud element contains a passage through which the pin extends, in a loosely fitting relation enabling the desired relative shifting movement of the stud, but still preventing its rotation. For maximum simplicity, the pin may also serve a second function of retaining the stud element against removal from the outer body in an axially inward direction.

The outer body may be designed to be permanently locked against unscrewing rotation from the carrier part. For this purpose, I may employ any of different types of locking arrangements, but prefer to utilize the general type of locking key shown in my Patent No. 2,855,970, issued Oct. 14, 1958, on "Insert Having Frictionally Retained Key Which Upsets Threads of Base Member."

Certain additional features of the invention relate to the optional provision of means for maintaining the shiftable stud against cocking or tilting movement to an inclined position relative to the outer body, so that the stud may always, if desired, project directly outwardly and perpendicular to the outer surface of the carrier part. To achieve this result, I find it desirable in some situations to employ a spring in the device for maintaining the stud against such tilting movement.

The above and other features and objects of the invention will be better understood from the following detailed description of the typical embodiments illustrated in the accompanying drawing, in which:

FIG. 1 is a side view of a self-aligning stud assembly constructed in accordance with the invention, and showing the assembly screwed into a carrier part;

FIG. 2 is an enlarged fragmentary axial section through the assembly of FIG. 1;

FIG. 3 is an axial section taken on line 3—3 of FIG. 2;

FIG. 4 is a bottom view of the fastener assembly taken on line 4—4 of FIG. 3; and FIGS. 5 and 6 are views similar to FIG. 3, but showing two variational forms of the invention.

Referring first to FIG. 1, there is shown at 10 a self-aligning stud assembly constructed in accordance with the invention, as the assembly appears after being screwed into a carrier part or parent material 11, but prior to permanent locking of the assembly against unscrewing rotation by axial driving of its two locking keys 12. The carrier part contains a bore 13, having internal threads 14 into which the stud assembly is screwed, with a frusto-conical countersink 114 being formed in the carrier part at the outer end of the threads.

Assembly 10 includes an outer essentially tubular hollow body 15, and a relatively shiftable stud element 16 carried by the outer body. Body 15 has external threads 17 shaped to mate with and screw into threads 14 of the carrier part. At two diametrically opposite locations, there are formed through the threads two key receiving grooves 18 which extend axially along the outer surface of body 15, and have the dovetail transverse cross sectional configuration brought out in FIG. 4. Keys 12, which are formed essentially in correspondence with the teachings of my prior Patent No. 2,855,970, have axially inner portions 19 which are frictionally received and held in fixed position within dovetail grooves 18, to initially retain the keys in the positions of FIGS. 1 and 2. These portions 19 are thin enough radially to be received within the minor diameter of threads 14 of the carrier part, and to thus avoid interference with screwing of the body 15 into threads 14. Axially outwardly beyond transverse end surface 20 of body 15, each of the keys has a thickened, radially outwardly projecting portion 21, which acts upon axial driving of the keys relative to body 15 to cut through the material of carrier part threads 14 at a localized area, and thus form a lock against unscrewing rotation of body 15 relative to the carrier part.

Internally, body 15 has along most of its axial extent an inner cylindrical surface 22 which is centered about the same axis 23 as are external threads 17 of the body. At the upper or axially outer end of body 15, this part has an integral radially inwardly projecting annular flange 24, which forms at its axially inner side an annular shoulder surface 25 disposed transversely of axis 23. Internally, flange 24 has a cylindrical surface 26 of a diameter smaller than cylindrical surface 22 of the body, but centered about the same axis 23 as is that surface.

To describe now the structure of the stud proper designated 16 in the drawing, this part has an axially outwardly projecting elongated shank portion 27, which in the centered position in which the stud is illustrated in the figures extends along axis 23, and carries external threads 28 at its axially outer end for engagement with a nut to be utilized in connecting carrier part 11 to another element. At the location at which this shank extends through reduced diameter flange 24 of the body, the shank may have an external cylindrical surface 29, of a diameter smaller than the internal surface 26 of the body, so that the shank is free for shifting movement transversely of axis 23 relative to the body.

At its axially inner end, and within body 15, stud 16 has an enlarged portion 30, having an outer cylindrical surface 31 centered about the same axis as is shank portion 27 (axis 23 in the illustrated centered position of the stud), and of a diameter substantially smaller than the diameter of inner surface 22 of the body 15, so that enlargement 30 is shiftable transversely of axis 23, in any desired direction, relative to and within the body. At the juncture of the cylindrical surface 29 of the shank and surface 31 of enlargement 30, the stud 27 has a shoulder surface 32 which is disposed transversely of axis 23, and is annular thereabout, and bears axially outwardly (upwardly) against shoulder surface 25 of the body to transmit axially outward load forces from the stud to the outer body. Preferably, surfaces 32 and 25 are so dimensioned as to have some engagement throughout the entire 360 degree circular extent of these surfaces in all positions to which stud 27 is laterally shiftable.

Enlargement 30 of the stud contains a passage 33, which extends diametrically across the axially inner side of the enlargement, and which opens axially inwardly (downwardly in FIGS. 2 and 3). This passage is defined at its opposite sides by two parallel axially extending planar side wall surfaces 34, which may be spaced equally in opposite directions from the axis 23 of the stud. The upper side of passage 33 is defined and closed by a surface 35, which extends directly transversely of axis 23.

Extending diametrically and transversely across the interior of body 15, there is provided a force transmitting pin 36, which may be externally cylindrical about an axis 37 disposed transversely of and intersecting axis 23 of the body. This pin extends into and is permanently secured within two diametrically opposite aligned circular passages or openings 38 formed in the side wall 39 of tubular body 15. These passages 38 may have cylindrical walls 139, centered about axis 37, and of a diameter such that pin 36 is a tight pressed fit within the passages or openings 38, so that the pin may be driven to its illustrated position of extension diametrically across the body, and will be frictionally retained in that position by the pressed fit relationship. At its opposite ends, pin 36 may have two planar end surfaces 40 disposed transversely of axis 37 of the pin, and located to be received within the minor diameters of threads 14 of the carrier part and threads 17 of body 15, to avoid interference with the carrier part threads when the body is screwed into those threads. In most instances, it is preferred that the end surfaces 40 of pin 36 be substantially flush with, or very slightly inwardly of, the axially extending modified minor diameter surfaces 13 of threads 17. As seen in FIG. 2, the diameter of the pin should be less than the spacing between side wall surfaces 34 of passage 33 in the stud, to allow transverse shifting movement of the stud relative to the pin. Also, the pin may be positioned to allow very slight axial movement of the stud before the pin engages surface 35 of passage 33.

To describe the manner of use of the stud illustrated in FIGS. 1 through 4, the first step in placing the device in use is of course to screw body 15 into threads 14 of the carrier part and to the position illustrated in FIG. 1. This advancement of the body 15 into the carrier part is automatically limited at a predetermined optimum position of installation in which outer surface 20 of body 15 is set slightly inwardly beyond the plane of outer surface 42 of the carrier part. This motion is limited by engagement of portions 21 of keys 12 with countersink surface 14 of the carrier part. Next, the keys 12 are driven axially from the full line position of FIG. 1 to the broken line position of that figure, to cut through the carrier part threads and permanently lock body 15 in the carrier part and against unscrewing rotation relative thereto.

With the device thus installed in the carrier part, a mating member may be brought into engagement with the outer surface 42 of the carrier part, with stud 27 passing through an opening in the part, and a nut may then be connected onto the stud to secure the parts together. In making this connection, stud 16 is free to shift transversely of axis 23 in any direction necessary to bring the parts into proper engagement for attaching a nut to the stud. At the same time, pin 36 acts to positively retain the stud against rotation during attachment of a nut to the stud, and also retains the stud in its properly assembled position within the outer body.

FIG. 5 shows a variational form of the invention which may be considered as essentially identical with that of FIGS. 1 to 4, except for the provision of a spring 43 axially between shoulder 25a of body 15a and transverse shoulder surface 32a of stud 16a. The purpose of spring 43 is to exert an axial force against stud 16a in a direction holding surface 35a of passage 33a in engagement with pin 36a, in a manner such that shank 27a of the stud is held in a position of parallelism with the main axis 23a of body 15a, and is held against cocking or tilting movement to a position of inclination with respect to that axis.

Spring 43 may be of any type capable of exerting the desired axial force, and also capable of transmitting axially outward (upward) load forces between surfaces 25a and 32a when a nut is tightened onto the stud. A coil spring or the like might be employed for this purpose, but I have typically illustrated a Belleville type spring, which is annular, and of the frusto-conical cross section illustrated in FIG. 5, and is adapted to resiliently deform to a flattened condition when axial load forces are applied to the device.

FIG. 6 shows another variational form of the invention which utilizes a spring 43b serving generally the same function as spring 43 of FIG. 5, to prevent cocking or tilting of stud 16b relative to outer body 15b. However, in FIG. 6, the spring 43b is at the axially inner or lower end of the stud, to bear upwardly against bottom transverse surface 116 of the stud, and bear downwardly against an annular inturned bottom flange 115 of body 15b. Thus, spring 43b holds shoulder surfaces 25b and 32b in engagement with one another, to in this way maintain the shank 27b of the stud parallel to the axis of body 15b at all times, in spite of the freedom for transverse self-aligning shifting movement of the stud.

I claim:

1. A fastener assembly comprising an outer body to be connected to a carrier part, a self-aligning element at least partially contained within said body and carrying threads disposed about an axis to which another member may be connected to secure said member to the carrier part through the medium of said fastener assembly, said body having a generally tubular side wall extending about said self-aligning element, the maximum transverse dimension of said self-aligning element within the body being less than the internal dimension of the surrounding portion of said side wall whereby said element is free for bodily lateral shifting movement within and relative to said body and transversely of said axis, said side wall containing two essentially diametrically opposed apertures, a pin extending generally transversely across the interior of said body and having its opposite ends connected into said apertures, and a radially inwardly extending shoulder on said body coacting with a cooperating shoulder on said element to retain said self-aligning element against axially outward movement relative to the body beyond a predetermined position and transmitting axially outward load forces from said element to the body in said predetermined position, while enabling said lateral shifting movement of said element, and without transmitting said axially outward load forces through said pin, said self-aligning element containing a transverse recess through which said pin extends to prevent rotation of the self-aligning element relative to said body, said recess having a pair of side walls spaced apart a distance greater than the transverse dimension of said pin to receive said pin loosely in a relation leaving substantial clearance, transversely of said pin, between the pin and said side walls of the recess, and thereby enabling said lateral shifting movement of the element both transversely of the pin and longitudinally thereof.

2. A fastener assembly as recited in claim 1, in which said recess has another wall surface facing axially inwardly and engageable with said pin in a relation preventing axially inward removal of the element from said body, said recess being open at its axially inner side.

3. A fastener assembly as recited in claim 1, in which said recess has at its axially outer end a wall surface which faces axially inwardly and is spaced from said pin in said predetermined position of said element in a relation enabling limited axial movement of said element relative to said pin, there being yielding means urging said element axially relative to the body.

4. A fastener assembly as recited in claim 1, in which said recess has at its axially outer end a wall surface which faces axially inwardly and is spaced from said pin in said predetermined position of said element in a relation enabling limited axial movement of said element relative to said pin, there being a spring urging said element axially outwardly to the extent permitted by said shoulders.

5. A fastener assembly as recited in claim 1, in which said recess has at its axially outer end a wall surface which faces axially inwardly and is spaced from said pin in said predetermined position of said element in a relation enabling limited axial movement of said element relative to said pin, there being a spring urging said element axially inwardly against said pin.

6. A fastener assembly comprising an outer body to be connected to a carrier part, a self-aligning element having a shank portion projecting axially outwardly from and beyond said body and carrying external threads beyond the body which are disposed about an axis and to which another member may be connected to secure said member to the carrier part through the medium of said fastener assembly, said self-aligning element having an enlarged portion at the axially inner end of said shank portion, said body having a generally tubular side wall extending about said enlarged portion of said self-aligning element and having external threads to be screwed into said carrier part, the maximum transverse dimension of said self-aligning element within the body being less than the internal dimension of the surrounding portion of said side wall, whereby said element is free for bodily lateral shifting movement within and relative to said body and transversely of said axis, a radially inwardly extending shoulder on said body coacting with a cooperating shoulder on said element at essentially the juncture of said shank portion and said enlarged portion of the self-aligning element to retain said self-aligning element against axially outward movement beyond a predetermined position and transmitting axially outward load forces from said element to said body in said predetermined position while enabling said relative lateral shifting movement of said element, said side wall containing two essentially diametrically opposed apertures, and a pin extending generally transversely across the interior of said body and having its opposite ends connected into said apertures, said enlarged portion of said self-aligning element containing a transverse recess through which said pin extends to prevent rotation of the self-aligning element relative to said body, said recess having a pair of side walls spaced apart a distance greater than the transverse dimension of said pin to receive said pin loosely in a relation leaving substantial clearance, transversely of said pin, between the pin and said side walls of the recess, and thereby enabling said lateral shifting movement of the element both transversely of the pin and longitudinally thereof.

7. A fastener assembly as recited in claim 6, in which said recess has another wall surface facing axially inwardly and engageable with said pin in a relation preventing axially inward removal of the element from said body, said recess being open at its axially inner side.

8. A fastener assembly as recited in claim 6, in which said recess has at its axially outer end a wall surface which faces axially inwardly and is spaced from said pin in said predetermined position of said element in a relation enabling limited axial movement of said element relative to said pin, there being yielding means urging said element axially relative to the body.

9. A fastener assembly as recited in claim 6, including a spring in said body between said two shoulders and yieldingly urging said element axially into engagement with said pin.

10. A fastener assembly as recited in claim 6, including a spring at the axially inner end of said enlarged portion of the element and urging said element axially outwardly relative to the body to maintain said two shoulders in engagement with one another.

11. A fastener assembly as recited in claim 6, in which said pin is externally cylindrical and disposed directly transversely across said body, said side walls of the recess being substantially planar and disposed parallel to one another at opposite sides of and parallel to said axis, said recess having an axially outer planar wall disposed transversely of said axis and facing axially inwardly toward said pin, said recess being open at its axially inner side, said shoulders being essentially annular and disposed directly transversely of said axis, and engaging one another in load transmitting but relatively shiftable relation.

References Cited

UNITED STATES PATENTS

| 3,233,645 | 2/1966 | Neuschotz | 151—23 |
| 3,342,096 | 9/1967 | Bobrowski | 85—32 |

FOREIGN PATENTS

| 42,800 | 8/1933 | France. |
| 828,194 | 2/1960 | Great Britain. |

CARL W. TOMLIN, *Primary Examiner.*

R. S. BRITTS, *Assistant Examiner.*

U.S. Cl. X.R.

151—41.76